US010056832B2

(12) United States Patent
Mizuno

(10) Patent No.: US 10,056,832 B2
(45) Date of Patent: Aug. 21, 2018

(54) LOAD DRIVING CONTROL APPARATUS

(71) Applicant: DENSO CORPORATION, Kariya, Aichi-pref. (JP)

(72) Inventor: Yuta Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/498,690

(22) Filed: Apr. 27, 2017

(65) Prior Publication Data

US 2018/0026532 A1    Jan. 25, 2018

(30) Foreign Application Priority Data

Jul. 19, 2016 (JP) .................................. 2016-141646

(51) Int. Cl.
*H02M 1/32* (2007.01)
*H02M 3/156* (2006.01)

(52) U.S. Cl.
CPC .................................. *H02M 3/156* (2013.01)

(58) Field of Classification Search
CPC .......... H02M 1/08; H02M 1/00; H03K 3/017; H03K 7/08; H05B 33/0806; B62D 5/0469
USPC ................. 327/100, 172, 175, 176; 323/222, 323/282–287; 318/400.03, 432, 469, 599
See application file for complete search history.

(56) References Cited

U.S. PATENT DOCUMENTS

| 5,933,313 | A | 8/1999 | Furukawa | |
| 7,663,330 | B2 * | 2/2010 | Yamazaki | B62D 5/0469 318/432 |
| 8,664,883 | B2 * | 3/2014 | Hiramatu | H05B 33/0815 315/291 |
| 8,884,592 | B2 * | 11/2014 | Mirea | H02M 3/1563 323/271 |
| 8,937,466 | B2 * | 1/2015 | Trattler | H02M 3/156 323/282 |
| 8,947,145 | B2 * | 2/2015 | Fujiwara | H02M 1/08 315/224 |
| 9,240,719 | B2 * | 1/2016 | Usuda | H02M 3/157 |
| 2013/0147459 | A1 * | 6/2013 | Kim | B60L 3/0038 323/351 |

(Continued)

FOREIGN PATENT DOCUMENTS

JP    2014-236122 A    12/2014

*Primary Examiner* — Rajnikant Patel
(74) *Attorney, Agent, or Firm* — Posz Law Group, PLC

(57) ABSTRACT

A load driving control apparatus calculates current slopes in an on-period and an off-period in one PWM cycle period, respectively, by using actual currents at a start time point and an end time point of the PWM cycle period as well as two sets of data, as data including a duty ratio corresponding to the actual current values. The data is so determined that the actual current data value of predetermined one of the start time point and the end time point is within a learning area. The duty ratio is calculated based on a difference between a target current value and the actual current value until calculation of the current slopes and is completed. The duty ratio is calculated based on the current slopes, the actual current value at start time point and a target current value after the calculation of the current slopes is completed. Since an actual current change characteristic is calculated based on the actual current values and the duty ratio is calculated based on the current change characteristic, robustness is enhanced.

6 Claims, 8 Drawing Sheets

(56) References Cited

U.S. PATENT DOCUMENTS

2014/0347028 A1* 11/2014 Jayaraj ................ H02M 3/1588
323/282

* cited by examiner

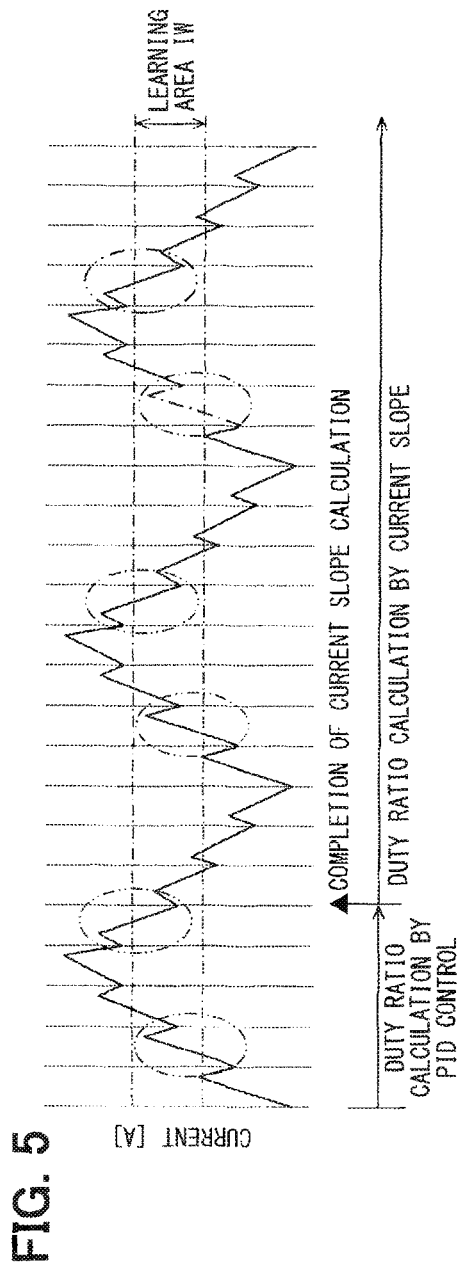
FIG. 5
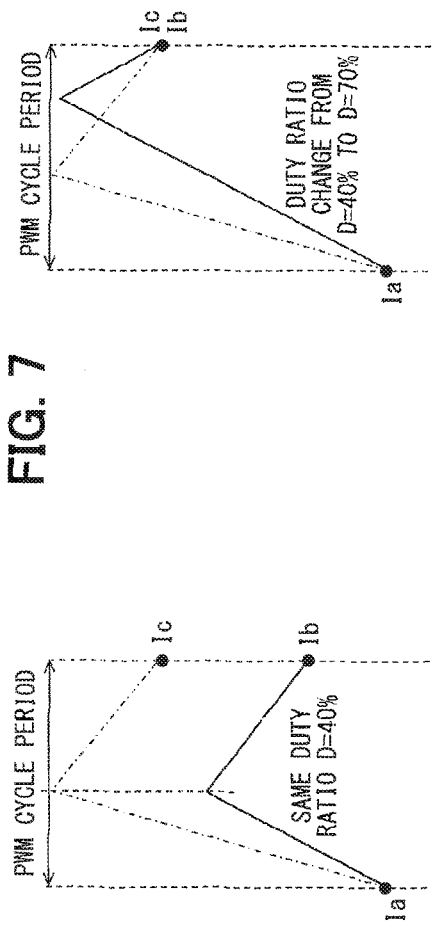
FIG. 6
FIG. 7

LOAD DRIVING CONTROL APPARATUS

CROSS REFERENCE TO RELATED APPLICATION

The present application is based on Japanese patent application No. 2016-141646 filed on Jul. 19, 2016, the whole contents of which are incorporated herein by reference.

Field

The present disclosure relates to a load driving control apparatus, which controls driving of an inductive load.

Background

JP 2014-236122A discloses a load driving control apparatus, which controls driving of an inductive load. This load driving control apparatus includes a switching element, which is provided in a current supply path for an inductive load and turned on to supply current to an inductive load, an actual current value detecting part for detecting an actual current value, which indicates a value of current actually supplied to the inductive load, a duty ratio setting part and a PWM driving part.

The duty ratio setting part calculates a duty ratio based on a difference between a target current value, which is a target value of current to be supplied to the inductive load, and the detected actual current value, and sets the calculated duty ratio. The PWM driving part generates a PWM signal of the set duty ratio at every predetermined interval and outputs the generated PWM signal to the switching element.

In case that the duty ratio is set based on the difference between the target current value and the actual current value as described above, the duty ratio is calculated in accordance with a PID control method, for example. Each gain for the PID control is predetermined. As a result, when an inductance value of the inductive load varies because of aging degradation and specification change, for example, the gain need be readjusted to maintain control precision. That is, robustness is low.

SUMMARY

It is therefore an object to provide a load driving control apparatus, which has higher robustness.

A load driving control apparatus for controlling driving of an inductive load comprises a switching element, an actual current value detection part, a duty ratio setting part, a PWM driving part. The switching element is provided in a current supply path to the inductive load to supply current to the inductive load when turned on. The actual current value detection part detects an actual current value, which is supplied to the inductive load. The duty ratio setting part sets a duty ratio based on the actual current value and a target current value, which is a target value of the current supplied to the inductive load. The PWM driving part generates a PWM signal having the duty ratio, which is set by the duty ratio setting part, at a predetermined cycle period and outputs the PWM signal to the switching element.

The duty ratio setting part includes a slope calculating part, a first calculating part and a second calculating part. The slope calculating part calculates a first slope and a second slope indicating slopes of currents in an on-period and an off-period in one cycle period of the PWM signal, respectively, by using the actual current values at a start time point and an end time point of the PWM signal as well as two sets of data, which include the duty ratios corresponding to the actual current values and the actual current value of predetermined one of the start time point and the end time point of which is within a predetermined current area. The first calculating part calculates the duty ratio based on a difference between the target current value and the actual current value. The second calculation part calculates the duty ratio based on the first slope, the second slope, the actual current value at the start time point and the target current value, when a predetermined one of the current values between the actual current value at the start time point and the target current value is within the current area. The PWM driving part generates the PWM signal by using the duty ratio calculated by the first calculating part until calculation of the first slope and the second slope is completed and generates the PWM signal by using the duty ratio calculated by the second calculating part after the calculation of the first slope and the second slope is completed.

BRIEF DESCRIPTION OF THE DRAWINGS

FIG. 5 is a time chart showing switching time points between PID control and control based on a current slope;

FIG. 6 is a chart showing a reference example;

FIG. 7 is a chart showing an advantage of the duty ratio calculation performed by using the current slope;

DETAILED DESCRIPTION OF THE EMBODIMENT

Figure 1:
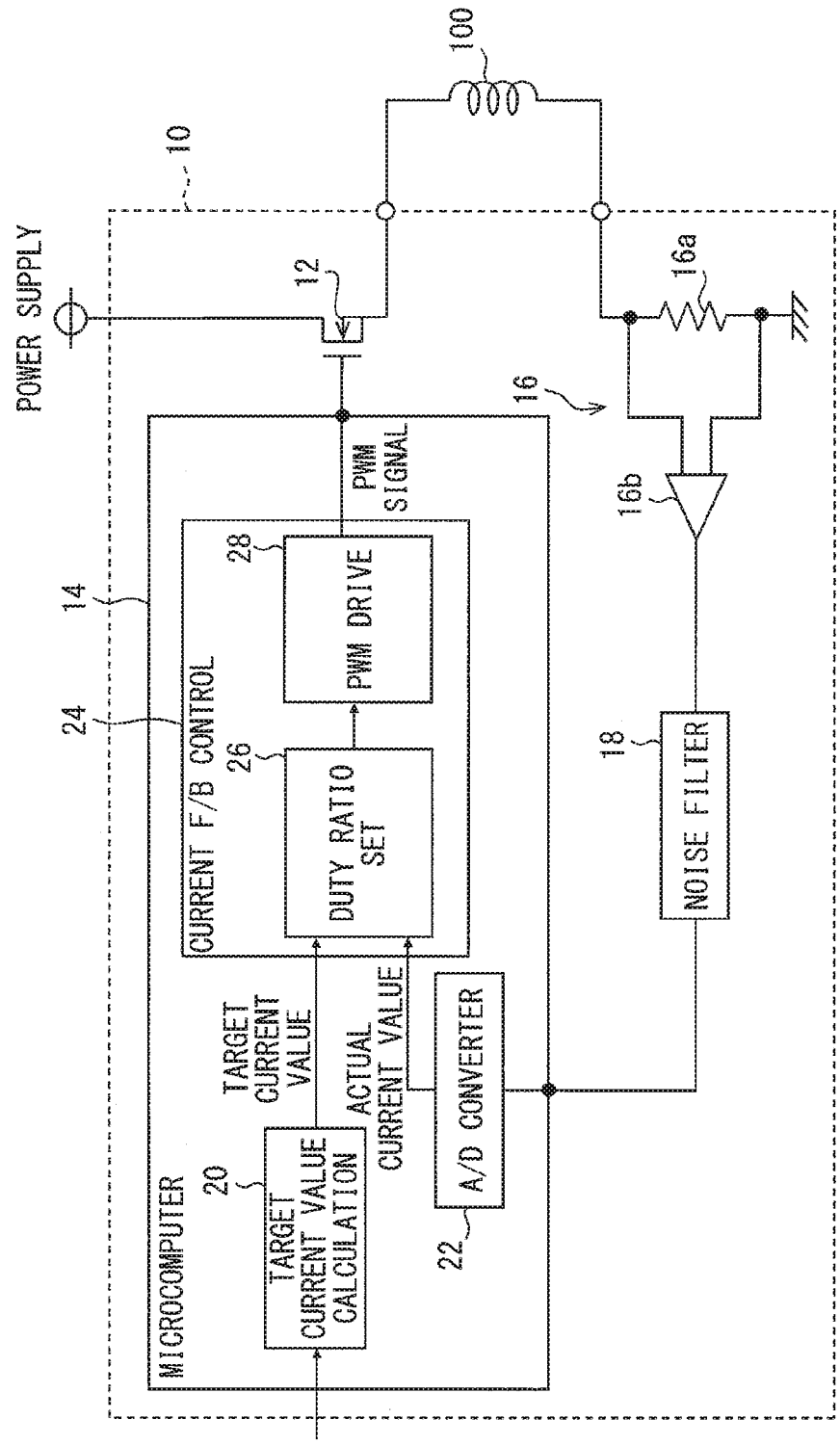
FIG. 1 is a block diagram showing a general configuration of a load driving control apparatus according to a first embodiment.

A load driving control apparatus will be described with reference to plural embodiments shown in the drawings, in which functionally or structurally corresponding parts are designated with same reference numerals.

First Embodiment

In the present embodiment, as shown in FIG. 1, a load driving control apparatus 10 is provided for a linear solenoid 100, which is provided as an inductive load in a hydraulic valve. As one example, the linear solenoid 100 controls engagement and disengagement of a clutch hydraulically thereby to control an automatic transmission of a vehicle to a target gear ratio.

The linear solenoid 100 includes a coil and a plunger, which are not shown, and controls an operation of the plunger and hence a spool coupled to the plunger by controlling current supply to the coil.

The load driving control apparatus 10 includes a switch 12, a microcomputer 14, a current detecting circuit 16 and a noise filter 18. The load driving control apparatus 10 is an electronic control unit (ECU).

The switch 12 is provided in a current supply path from a power supply to the linear solenoid 100 and controlled to turn on and off in response to a pulse signal supplied from the microcomputer 14. The pulse signal is a pulse-width modulated signal (PWM signal) having a variable duty ratio D. The duty ratio D is a rate of on-period of the PWM signal to a cycle period (on-period plus off-period) of the PWM signal. When the switch 12 is turned on and off, current is supplied and not supplied to the linear solenoid 100, respectively.

In the present embodiment, a MOSFET is used as the switch 12 and provided at a power supply side (higher potential side) relative to the linear solenoid 100. With a PWM signal supplied to the MOSFET as a gate signal, the switch 12 is turned on and off in correspondence to the PWM signal. The switch 12 is a switching element.

The microcomputer 14 includes a CPU, a ROM, a RAM, registers and I/O ports. In the microcomputer 14, the CPU executes various signal processing in correspondence to control programs stored in the ROM and various data acquired from an external side by using temporary storing functions of the RAM and registers. The microcomputer 14 further outputs signals produced in the signal processing. The microcomputer 14 thus executes various functions. The microcomputer 14 will be described in detail later.

The current detecting circuit 16 includes a resistor 16a, which is connected in series with the linear solenoid 100, and an operational amplifier 16b, which amplifies a voltage developed at both ends of the resistor 16a and outputs the amplified voltage. The resistor 16a is provided at a lower potential side of the linear solenoid 100. The resistor 16a is provided to produce the voltage, which is proportional to a current (exciting current) flowing in the linear solenoid 100.

The operational amplifier 16b has a positive input terminal, which is electrically connected to a high-potential side terminal of the resistor 16a, and a negative input terminal, which is electrically connected to a low-potential side terminal of the resistor 16a. The operational amplifier 16b thus amplifies the voltage developed between both terminals of the resistor 16a and outputs the amplified voltage.

The noise filter 18 filters out noises in the amplified voltage outputted from the operational amplifier 16b. The noise filter 18 is a low-pass filter, which is formed of a resistor and a capacitor.

The microcomputer 11 is configured as shown in FIG. 1. The microcomputer 14 includes a target current value calculating part 20, an A/D converter 22 and a current feedback (F/B) control part 24.

The target current value calculating part 20 calculates a current value, that is, a target value of current, which is to be supplied to the linear solenoid 100 so that the linear solenoid 100 as a control object is driven to a target state. The target current value calculating part 20 calculates the target current value based on signals supplied from a rotation detecting sensor, which detects a rotation speed of an input side of an automatic transmission, and a rotation detecting sensor, which detects a rotation speed of an output side of the automatic transmission.

The target current value calculating part 20 first detects the rotation speed of the input side and the rotation speed of the output side of the automatic transmission based on the signals supplied from the rotation detecting sensors. The target current value calculating part 20 then calculates a target value of hydraulic pressure, which is to be supplied to the automatic transmission, based on the rotation speed of the input side and the rotation speed of the output side. The target current value calculating part 20 further calculates the target current value as the current, which is to be supplied to the linear solenoid 100, based on the calculated target hydraulic pressure. A relation of correspondence between the target hydraulic pressure value and the target current value is predetermined and stored in the ROM of the microcomputer 14 in the form of a data map. The target current value calculating part 20 calculates the target current value from the target hydraulic pressure value based on the predetermined relation between the target hydraulic pressure value and the target current value.

The A/D converter 22 converts an output signal of the noise filter 18, that is, an actual current value, to a digital value and outputs the digital value to the feedback control part 24. The current detecting circuit 16, the noise filter 18 and the A/D converter 22 correspond to an actual current value detecting part.

The current feedback control part 24 includes a duty ratio setting part 26 and a PWM driving part 28. The duty ratio setting part 26 sets a duty ratio of the pulse signal based on the target current value and the actual current value. The duty ratio setting part 26 executes current slope calculation processing and duty ratio calculation processing as described below. Each of those processing will be described below.

The PWM driving part 28 outputs the PWM signal for controlling driving of the switch 12. Although not shown, the PWM driving part 28 includes register for storing data, which defines the PWM signal to be outputted. The registers store the duty ratio supplied from the duty ratio setting part 26 and a cycle period of generation of the PWM signal. The PWM driving part 28 thus outputs the PWM signal in correspondence to the duty ratio and the cycle period of generation stored in the register.

The current slope calculation processing executed by the duty ratio setting part 26 will be described next with reference to FIG. 2. The duty ratio setting part 26 repeats execution of the processing shown in FIG. 2 during a period of power supply to the load driving control apparatus 10.

The duty ratio setting part 26 acquires the actual current values Ia and Ib from the A/D converter 22 at time points of a start time point and an end time point of each cycle period of the PWM signal, that is, PWM period, respectively (step S10). The duty ratio setting part 26 acquires the actual current values Ia and Ib at every PWM cycle period. The duty ratio setting part 26 acquires present values of the actual current values Ia and Ib at step S10. The actual current value Ib of the end time point equals the actual current value Ia of the start time point of the next PWM cycle period.

The duty ratio setting part 26 then checks whether a predetermined one of actual current values Ia and Ib acquired at step S10 is in a predetermined current slope learning area IW (step S20). The learning area IW is a current area of a predetermined range set for learning the current slope. The current slope is a change rate of current with respect to time. In the first embodiment, it is checked whether the actual current value Ib of the end time point is within the learning area IW. The width of the learning area IW is set to be between 0.1 [A (ampere)] to 0.4 [A].

Upon determination at step S20 that the actual current value Ib is within the learning area IW, the duty ratio setting part 26 calculates a difference Ib−Ia between the actual values Ia and Ib in one cycle period of the PWM signal acquired at step S10, acquires polarity (positive or negative)

information of the difference and calculates an absolute value of the difference |Ib−Ia|. The duty ratio setting part 26 checks, based on the absolute value of the difference, whether the slope of the actual current values Ia and Ib acquired at step S10 is sufficient (step S30). The difference is Ib−Ia, which is calculated by subtracting the actual current value Ia at the start time point from the actual current value Ib of the end time point. The duty ratio setting part 26 checks at step S30 whether the absolute value of the difference is equal to or larger than a predetermined value α. The predetermined value α is set to be larger than 0 and smaller than the width of the learning area IW. For example, the predetermined value α is set to 0.02 [A].

Upon determination at step S30 that the slope is sufficient, the duty ratio setting part 26 checks whether previous values of the actual current values Ia and Ib, the duty ratio D of the PWM cycle period and the polarity of the difference are stored in the RAM (step S40) and available for use in duty ratio calculation.

Upon determination at step S40 that the previous values are stored, that is, available, the duty ratio setting part 26 acquires the previous value of the polarity from the RAM and checks whether the present value of the polarity is different from the previous value (step S50). In case that the previous value of the polarity is positive and the present value of the polarity is negative, for example, the duty ratio setting part 26 determines that the polarity is different. In case that the difference Ib−Ia indicates a positive value, the polarity is positive and indicates a current increase with time. In case that the difference Ib−Ia indicates a negative value, the polarity is negative and indicates a current decrease with time.

Upon determination at step S50 that the polarity is different, the duty ratio setting part 26 calculates current slopes Sup and Sdw (step S60), which indicate the current change rates relative to time, and stores the calculated current slopes Sup and Sdw in the RAM (step S70). In the first embodiment, the current slopes Sup and Sdw are updated and stored.

Figure 3:
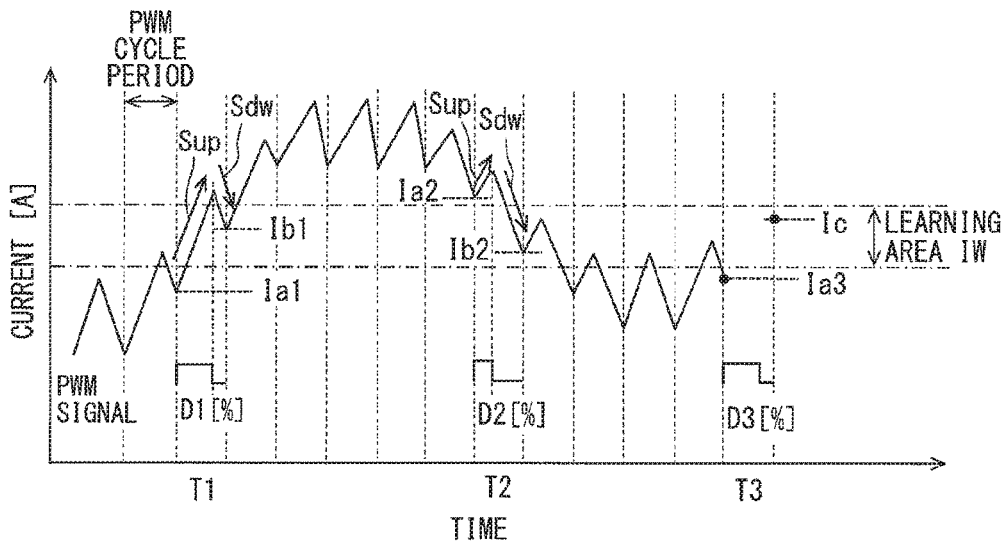
FIG. 3 is a time chart showing calculation of a current slope and a duty ratio executed by the duty ratio setting part.

The calculation method of the current slopes Sup and Sdw will be described with reference to FIG. 3. In FIG. 3, the area defined between two one-dot chain lines is the current slope learning area IW. The PWM cycle period is fixed. The current slope Sup indicates a slope in an on-period of the PWM cycle period and is referred to as a first slope. The current slope Sdw indicates a slope in an off-period of the PWM cycle period and is referred to as a second slope.

In case that the predetermined one of the actual current values Ia and Ib is in the same learning area IW at different time points in one PWM cycle period, the current slopes Sup and Sdw are generally equal. Therefore, as far as there are two combinations of the actual current values Ia and Ib as well as the duty ratio D, it is possible to calculate the current slopes Sup and Sdw in the learning area IW.

In FIG. 3, the actual current values Ib in a first cycle period T1 and a second cycle period T2 are assumed to be within the learning area IW. In the first cycle period T1, the actual current value Ia at the start time point is Ia1 [A], the actual current value Ib at the end time point is Ib1 [A] and the duty ratio is D1 [%]. In the second cycle period T2, the actual current value Ia at the start time point is Ia2 [A], the actual current value Ib at the end time point is Ib2 [A] and the duty ratio is D2 [%]. The slopes Sup and Sdw are calculated from the following simultaneous equations.

$$(Ib1-Ia1)=Sup \times D1 + Sdw(100-D1) \quad (1)$$

$$(Ib2-Ia2)=Sup \times D2 + Sdw(100-D2) \quad (2)$$

Assuming that the actual current values Ia2 and Ib2 in the second cycle period T2 are actual current values acquired at step S10, the actual current values Ia1 and Ia2 correspond to the actual current values Ia1 and Ib1 in the first cycle period T1, respectively. By varying the current (excitation current) as shown in FIG. 3 by PWM control, the spool of the linear solenoid 100 is vibrated slightly to reduce friction of the spool. This small vibration is referred to as dithering.

Referring to FIG. 2 again, after calculating and storing the current slopes Sup and Sdw, the duty ratio setting part 26 stores the present values of the actual current values Ia and Ib acquired at step S10, the present value of the duty ratio D and the present value of the polarity of the difference in the RAM (step S80). The stored present values are used as the previous values in the next processing. The duty ratio setting part 26 updates and stores the actual current values Ia and Ib, the duty ratio D and the polarity of the difference. Thus the processing of current slope calculation is completed.

Upon determination at step S20 that the actual current value is not in the learning area IW or determination at step S30 that the absolute value of the difference is smaller than the predetermined value α, the duty ratio setting part 26 finishes the series of processing described above without calculating the current slopes Sup and Sdw and storing the present values. Upon determination at step S40 that there are no previous values or determination at step S50 that the polarities are the same, the duty ratio setting part 26 executes step S80 and finishes the series of processing described above without calculating the current slopes Sup and Sdw. The processing of steps S10, S20, S30, S40, S50, S60, S70 and S80 corresponds to a slope calculation part.

Figure 4:
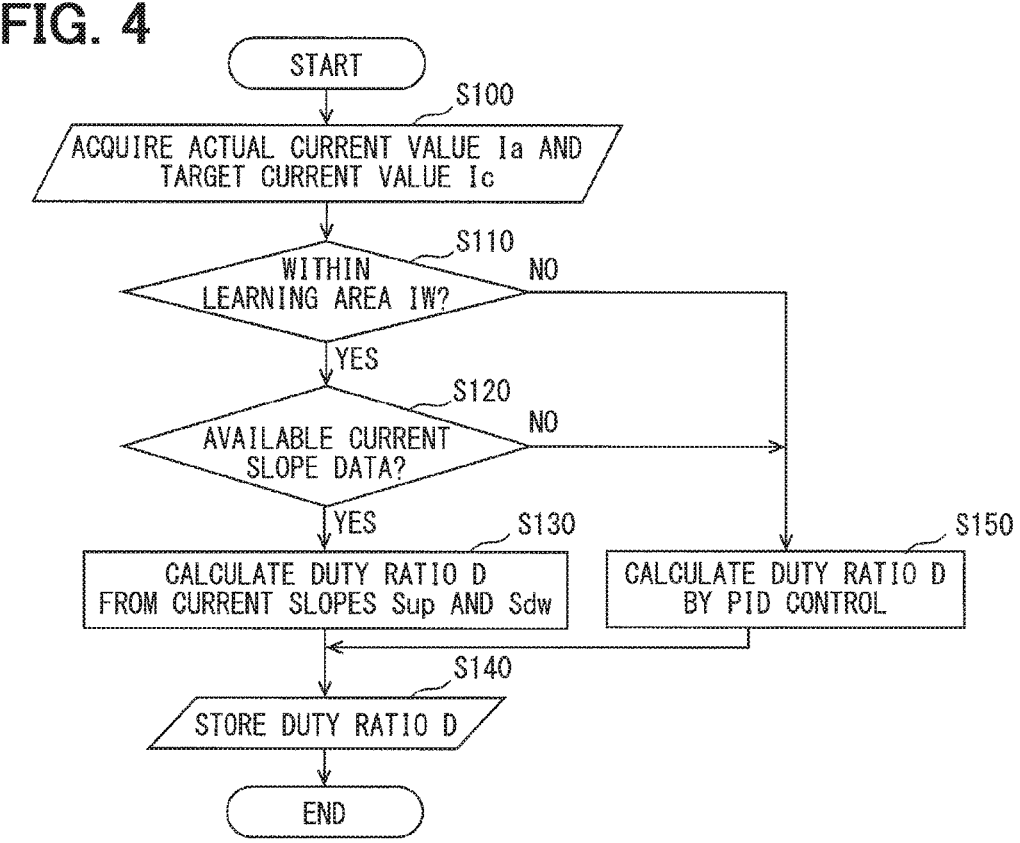
FIG. 4 is a flowchart showing current duty ratio calculation processing executed by the duty ratio setting part.

Duty ratio calculation processing executed by the duty ratio setting part 26 will be described next with reference to FIG. 4. The duty ratio setting part 26 repeats execution of the processing shown in FIG. 4 during a period of power supply to the load driving control apparatus 10. The duty ratio setting part 26 executes the current slope calculation and the duty ratio calculation in parallel.

The duty ratio setting part 26 not only acquires the actual current value Ia at the start time point of the PWM cycle period from the A/D converter 22 but also acquires a target current value Ic from the target current value calculating part 20 at the start time point of the PWM cycle period (step S100).

The duty ratio setting part 26 then checks whether the actual current value, which is out of the actual current value Ia and the target current value Ic acquired at step S100 and corresponds to the current at one of the start time point and the end time point to be used at step S20, is within the learning area IW (step S110). In case that the actual current value Ib at the end time point is used at step S20, the target current value Ic is used at step S110. In case that the actual current value Ta at the start time point is used at step S20, the actual current value Ia is used at step S110 as well. In the first embodiment, the target current value Ic is used.

Upon determination at step S110 that the actual current value is within the learning area IW, the duty ratio setting part 26 checks whether the current slope data is stored, that is, available (step S120). The duty ratio setting part 26 checks whether the current slopes Sup and Sdw, which correspond to the learning area IW, are stored in the RAM.

Upon determination at step S120 that the current slope data is available, the duty ratio setting part 26 acquires the current slopes Sup and Sdw from the RAM and calculates the duty ratio D (step S130). The duty ratio setting part 26 then stores the calculated duty ratio D in the RAM (step S140) and finishes the series of processing described above. The processing at step S130 corresponds to a second calculation part.

The duty ratio calculation method using the current slopes Sup and Sdw will be described below with reference to FIG. 3. In FIG. 3, the target current value Ic at the end time point of a third cycle period T3 is assumed to be within the learning area IW. For this reason, the current slopes Sup and Sdw are usable to the third cycle period as well. Relations among an actual current value Ia3 at the start time point of the third cycle period T3, the target current value Ic and the current slopes Sup and Sdw are expressed as follows.

$$(Ib3-Ia3) = Sup \times D3 + Sdw(100-D3) \qquad (3)$$

It is thus possible to calculate a duty ratio D3 [%] from the equation (3).

Referring to FIG. 4 again, upon determination at step S110 that the current value is not within the learning area IW or determination at step S120 that the current slope data is not stored, the duty ratio setting part 26 calculates the duty ratio by proportional-integral-derivative (PID) control (step S150). Gains of a proportional term (P), an integral term (I) and a derivative term (D) are predetermined. The duty ratio setting part 26 calculates the duty ratio D based on the difference between the actual current value Ia and the target current value Ic. The processing of step S150 corresponds to a first calculation part. The duty ratio setting part 26 then stores the calculated duty ratio D in the RAM (step S140) and finishes the series of processing described above.

In the first embodiment, in case that the current slopes Sup and Sdw are not stored, the duty ratio D is calculated by the PID control and the PWM signal is generated by using the calculated duty ratio D. Thus, as shown in FIG. 5, the duty ratio D is calculated by the PID control during a period from the power supply to the load driving control apparatus 10 to completion of calculation of the current slopes Sup and Sdw. After completion of calculation of the current slopes Sup and Sdw, the duty ratio D is calculated based on the current slopes Sup and Sdw. In FIG. 5, time points for storing the actual currents Ia and Ib are shown with two-dot chain line.

The load driving control apparatus 10 according to the first embodiment provides the following advantages.

In case that the inductance value of the linear solenoid 100 changes because of aging degradation or specification changes, the current change characteristic of the linear solenoid 100 also changes in correspondence to those changes. Further, in case that specification of the noise filter 18, which forms the actual current value detection part, is changed, the current change characteristic also changes. In the following description, it is assumed that the current change characteristic is changed from its initial characteristic because of the change in the inductance value of the linear solenoid 100.

A reference example shown in FIG. 6 shows a case that the duty ratio is calculated by the PID control. One-dot chain line in FIG. 6 shows an ideal current change from the current value Ia at the start time point to the target current value Ic before the inductance value changes. A solid line shows a current change after the inductance value changed under the state of the actual current value Ia and the target current value Ic. In case of the PID control, the gains are predetermined and the duty ratio D is calculated based on the actual current value Ia and the target current value Ic. As a result, when the inductance value changes, the actual current value Ib deviates from the target current value Ic as shown in FIG. 6. In FIG. 6, the duty ratio D is assumed to be 40% as one example.

In the first embodiment, as opposed to the reference example, the current slopes Sup and Sdw are calculated and the duty ratio D is calculated by using the calculated current slopes Sup and Sdw. Thus the current change characteristic is learned. With this learning, even in case that the inductance value changes, the duty ratio D is set in correspondence to the change in the current change characteristic as shown in FIG. 7. For this reason, even in case that the inductance value changes, it is possible to match the actual current value Ib to the target current value Ic. That is, even in case that the current change characteristic changes, it is possible to maintain high control precision in the learning area IW. The load driving control apparatus 10 thus has higher robustness than the conventional apparatus.

In FIG. 7, a one-dot chain line shows an ideal current change from the actual current Ia at the start time point to the target current value Ic before the inductance value changes. A solid line shows a current change after the inductance value changed under the state of the actual current Ia and the target current value Ic. In FIG. 7, the duty ratio D before the inductance value change is 40% and the duty ratio D after the inductance value change is 70%.

In the first embodiment, in particular, the current slopes Sup and Sdw are calculated by using two sets of data, that is, present data of the actual current values Ia and Ib acquired at present time as well as the duty ratio D and previous data of the actual current values Ia and Ib as well as the duty ratio D stored at previous time. Since the latest two sets of data are used, it is possible to maintain high control precision even when the current change characteristic changes in a short time period.

In case that the equations (1) and (2) described above are in a crossing relation, it is possible to calculate the current slopes Sup and Sdw from the equations (1) and (2). In case that the equations (1) and (2) are in a parallel relation, it is not possible to calculate the current slopes Sup and Sdw. In the first embodiment, however, the current slopes Sup and Sdw are calculated by using two sets of data. One set of data is the current increase time data, which has the positive polarity, that is, the actual current value Ib at the end time point is larger than the actual current value Ia at the start time point. The other set of data is the current decrease time data, which has the negative polarity, that is, the actual current value Ib at the end time point is smaller than the actual current value Ia at the start time point. That is, the current increase time data and the current decrease time data are stored alternately. Thus, it is less likely that the equations (1) and (2) become parallel because of influence of error or external disturbance than in case that the current slopes Sup and Sdw are calculated by using two sets of data of the same polarity. As a result, it is possible to exhibit high robustness against error and or external disturbance.

Figure 2:
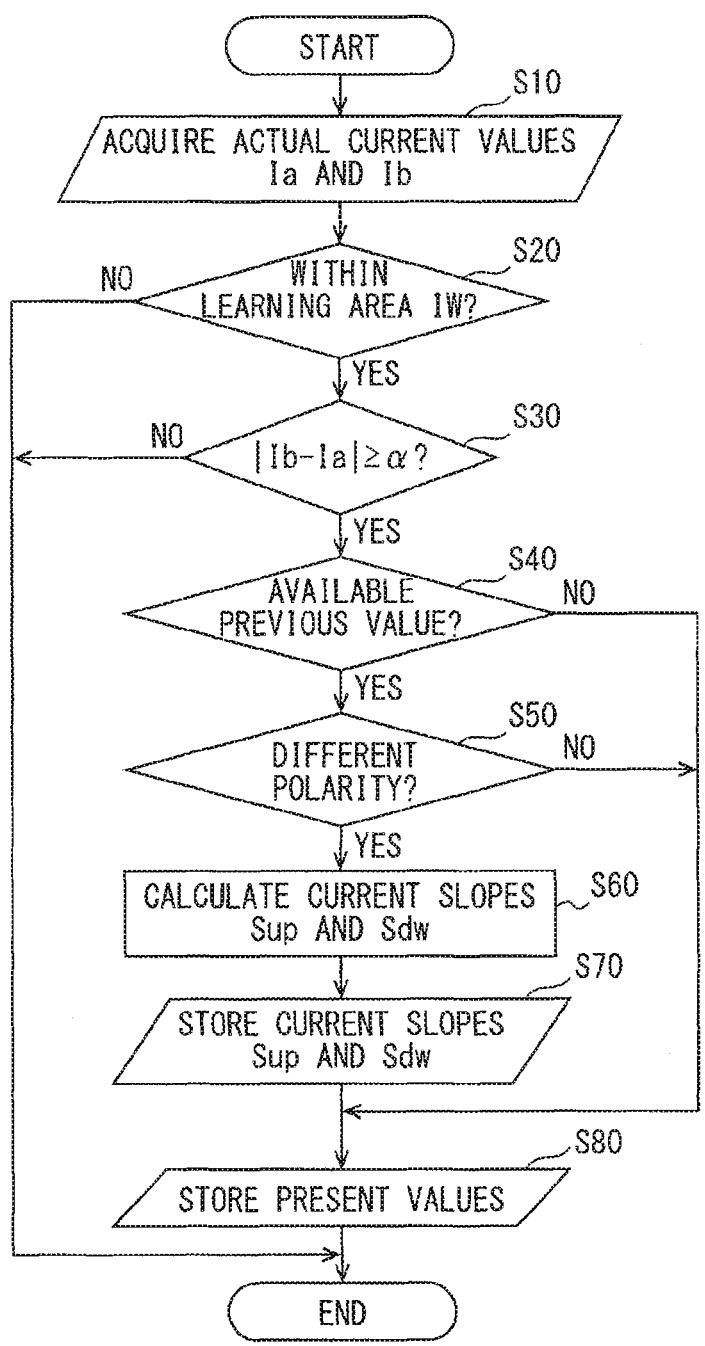
FIG. 2 is a flowchart showing current slope calculation processing executed by a duty ratio setting part.

It is noted that the current slope calculation processing is not limited to the example shown in FIG. 2. For example, as shown in FIG. 8 as a first modification example, steps S30 and S50 of FIG. 2 may be omitted.

Figure 8:
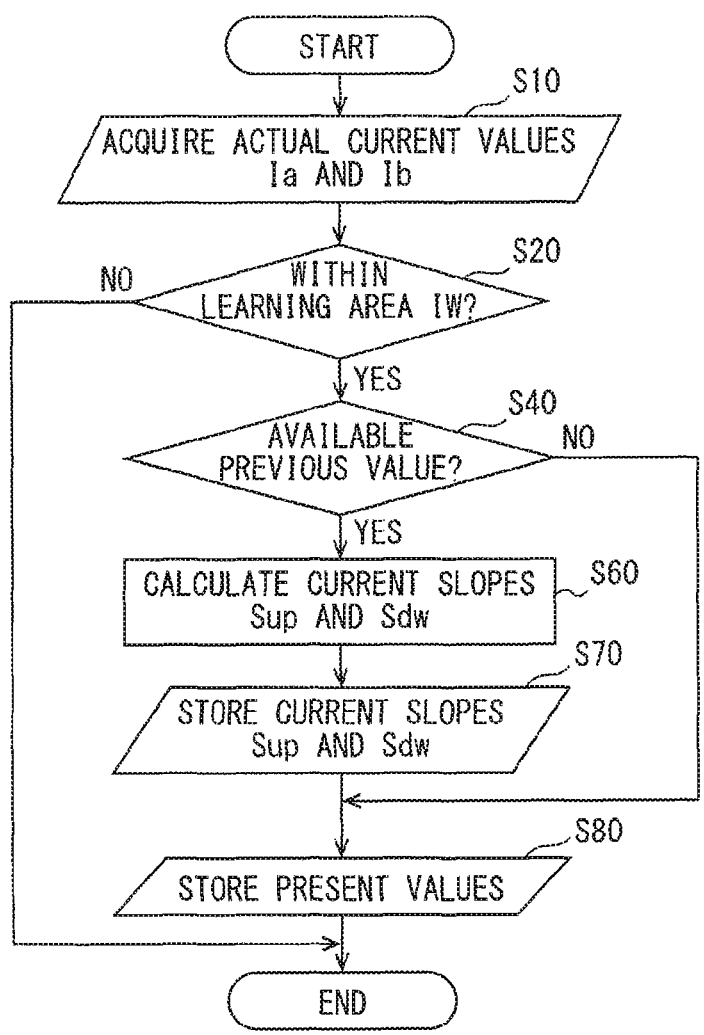
FIG. 8 is a flowchart showing a first variation of the current slope calculation processing.

In FIG. 8, at step S80, the actual current values Ia and Ib acquired at step S10 as well as the duty ratio D are stored as previous values. That is, the polarity of the difference is not stored. For this reason, in the modification example shown in FIG. 8, it is likely that the current slopes Sup and Sdw are calculated from two sets of data having the same polarity of difference.

It is further noted that only one of steps S30 and S50 may be omitted. In addition, the two sets of data for calculating the current slopes Sup and Sdw are not limited to the present value and the previous value, which are used in the first embodiment. The two sets of data may be a combination of the present value and one of plural past data stored in the RAM.

Second Embodiment

A load driving control apparatus 10 according to the second embodiment is similar to the first embodiment. The second embodiment will be described with reference to difference from the first embodiment while using the same reference numerals as used in the first embodiment.

Figure 9:
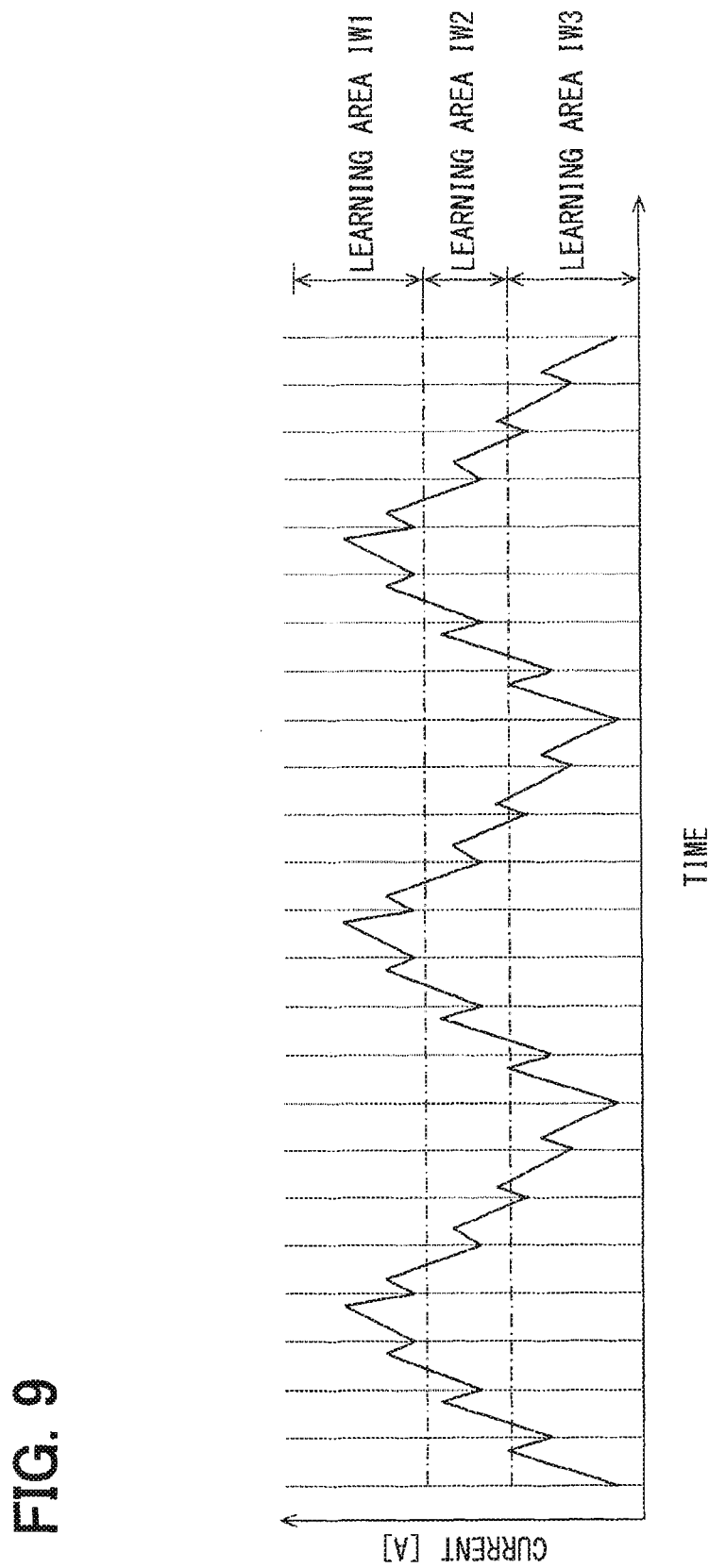
FIG. 9 is a time chart showing a learning area, in which current slope processing is executed, in a load driving control apparatus according to a second embodiment.

In the first embodiment, the learning area IW is exemplified to be only a part of a whole range of usable current of the linear solenoid 100. This embodiment is suitable in a case that particularly high control precision is required in a part of the whole range of usable current. In the second embodiment, as shown in FIG. 9, the usable current range is divided into plural learning areas, for example, three learning area IW1, IW2 and IW3. The learning areas IW1, IW2 and IW3 cover the whole range of the usable current. For example, the whole range of the usable current 0 to 1.0 [A] is divided into a first learning area IW1, which is from 0.6 [A] to 1.0 [A], a second learning area IW2, which is from 0.4 [A] to 0.6 [A], and a third learning area IW3, which is from 0.0 [A] to 0.4 [A].

Figure 10:
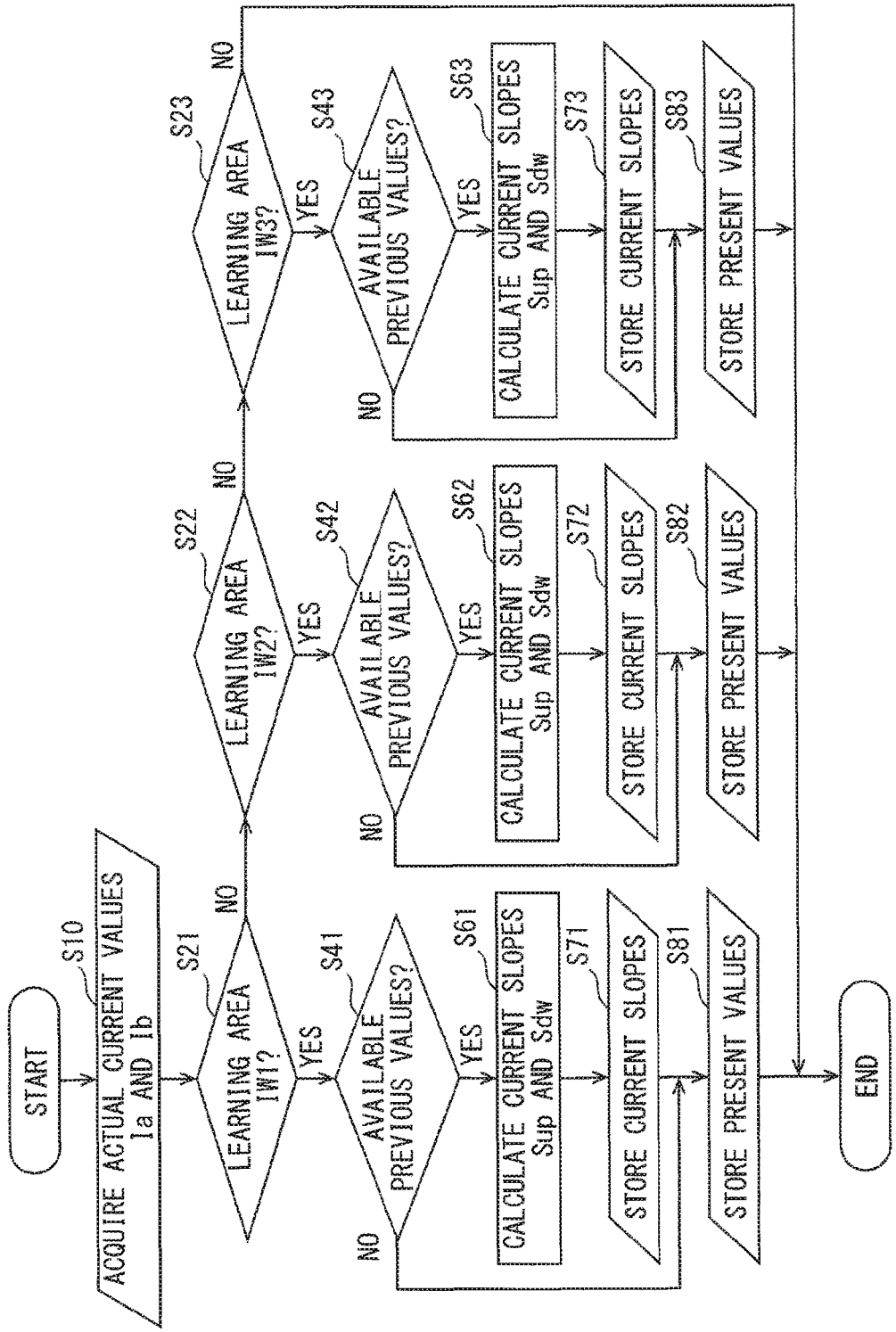
FIG. 10 is a flowchart showing the current slope calculation processing.

FIG. 10 shows current slope calculation processing executed by the duty ratio setting part 26. Step S10 is the same as that of FIG. 2. Steps S21, S22 and S23 correspond to step S20. At steps S21, S22 and S23, same time point sides between the start time point and the end time point are selected. Steps S41, S42 and S43 correspond to step S40. Steps S61, S62 and S63 correspond to step S60. Steps S71, S72 and S73 correspond to step S70. Steps S81, S82 and S83 correspond to step S80. In FIG. 10, steps S10 to S83 correspond to the slope calculation part.

After executing step S10, the duty ratio setting part 26 checks whether predetermined one of the actual current values between the actual current values Ia and Ib acquired at step S10 (for example, actual current value Ib) is within the first learning area IW1 of the current slope (step S21). Upon determination at step S21 that the checked actual current is within the first learning area IW1, the duty ratio setting part 26 executes processing of step S41 and subsequent steps S61, S71 and S81. The processing at steps S41, S61, S71 and S81 will not be described.

Upon determination at step S21 that the checked actual current is not within the first learning area IW1, the duty ratio setting part 26 checks whether the predetermined one of the actual current, values (for example, actual current value Ib) is within the second learning area IW2 of the current slope (step S22). Upon determination at step S22 that the checked actual current is within the second learning area IW2, the duty ratio setting part 26 executes processing of step S42 and subsequent steps S62, S72 and S82. The processing at steps S42, S62, S72 and S82 will not be described.

Upon determination at step S22 that the checked actual current is not within the second learning area IW2, the duty ratio setting part 26 checks whether the predetermined one of the actual current values (for example, actual current value Ib) is within the third learning area IW3 of the current slope (step S23). Upon determination at step S23 that the checked actual current is within the third learning area IW3, the duty ratio setting part 26 executes processing of step S43 and subsequent steps S63, S73 and S83. The processing at steps S43, S63, S73 and S83 will not be described.

Upon determination at step S23 that the checked actual current is not within the third learning area IW3, the duty ratio setting part 26 finishes the series of processing without calculating the current slopes Sup and Sdw.

Figure 11:
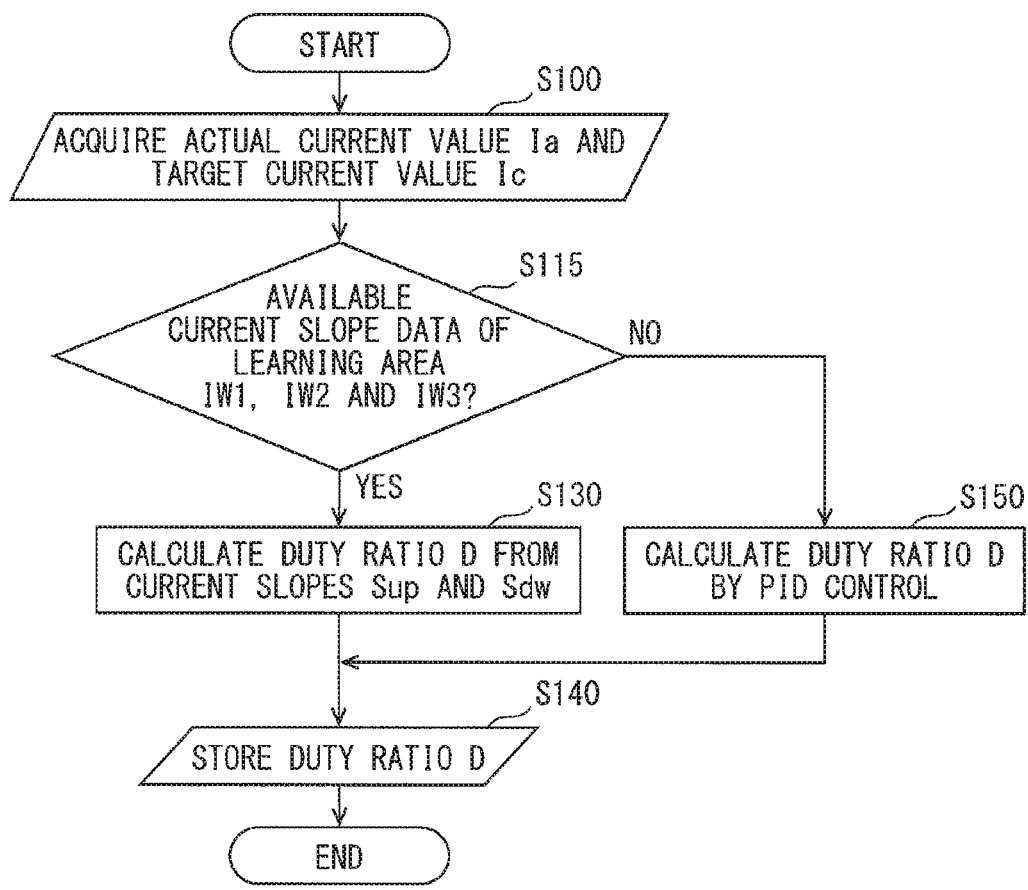
FIG. 11 is a flowchart showing the duty ratio calculation processing.

FIG. 11 shows duty ratio calculation processing executed by the duty ratio setting part 26. Processing at steps S100, S130, S140 and S150 is the same as those shown in FIG. 4. In the second embodiment, the duty ratio setting part 26 executes step S115 in place of steps S110 and S120 of FIG. 4.

At step S115, the duty ratio setting part 26 checks whether both of the current slopes Sup and Sdw are stored with respect to all of the learning areas IW1, IW2 and IW3. Upon determination that both of the current slopes Sup and Sdw are stored and available for each of the learning areas IW1, IW2 and IW3, the duty ratio setting part 26 executes step S130. Upon determination that the current slopes Sup and Sdw are not stored with respect to at least one of the learning areas IW1, IW2 and IW3, the duty ratio setting part 26 executes step S150.

At step S130, the duty ratio setting part 26 calculates the duty ratio D by using the current slopes Sup and Sdw of the corresponding learning area among the learning areas IW1, IW2 and IW3.

As described above, the load driving control apparatus 10 calculates the current slopes Sup and Sdw for each of plural learning areas IW1, IW2 and IW3. It is thus possible to maintain high control precision even in case that the current change characteristic changes in any of the learning areas IW1, IW2 and IW3. The load driving control apparatus 10 thus has more superior robustness over the whole area of the use current than the conventional apparatus.

The current slope calculation processing is not limited to the example described above. In the second embodiment, the current slope calculation processing shown in FIG. 2 may be used.

The load driving control apparatus 10 should not be limited to the disclosed embodiments but may be implemented differently as exemplified below.

In the embodiments described above, the linear solenoid 100 of the hydraulic valve for controlling hydraulic pressure of the automatic transmission, is exemplified as the inductive load. The inductive load is not limited to the linear solenoid 100 described above.

The duty ratio setting part 26 is exemplified to calculate the duty ratio D by the PID control until calculation of the current slopes Sup and Sdw is completed. The duty ratio D may be calculated by methods other than the PID control as far as the duty ratio D is calculate based on the difference between the actual current value Ia and the target current value Ic. For example, the duty ratio D may be calculated by PI control.

What is claimed is:

1. A load driving control apparatus for controlling driving of an inductive load, the load driving control apparatus comprising:
   a switching element provided in a current supply path to the inductive load to supply current to the inductive load when turned on;
   an actual current value detection part for detecting an actual current value, which is supplied to the inductive load;
   a duty ratio setting part for setting a duty ratio based on the actual current value and a target current value, which is a target value of the current supplied to the inductive load; and a PWM driving part for generating a PWM signal having the duty ratio, which is set by the duty ratio setting part, at a predetermined cycle period and outputting the PWM signal to the switching element, wherein the duty ratio setting part includes a slope calculating part, a first calculating part, and a second calculating part, the slope calculating part calculates a first slope and a second slope indicating slopes of currents in an on-period and an off-period in one cycle period of the PWM signal, respectively, by using two sets of data, which includes the duty ratio corresponding to the actual current values and the actual current values at a start time point and an end time point in one cycle period of the PWM signal when the actual current value of predetermined one of the start time point and the end time point is within a predetermined current area, the first calculating part calculates the duty ratio based on a difference between the target current value and the actual current value, and the second calculation part calculates the duty ratio based on the first slope, the second slope, the actual current value at the start time point and the target current value, when the actual current value of the predetermined one of the start time point and the end time point is within the predetermined current area, and wherein the PWM driving part generates the PWM signal by using the duty ratio calculated by the first calculating part until calculation of the first slope and the second slope is completed and generates the PWM signal by using the duty ratio calculated by the second calculating part after the calculation of the first slope and the second slope is completed.

2. The load driving control apparatus according to claim 1, wherein:

the slope calculating part calculates the first slope and the second slope by using, as the two sets of data, present data including a present value of the actual current value acquired at present time and the duty ratio corresponding to the present value and previous data including a previous value of the actual current value acquired at previous time and the duty ratio corresponding to the previous value.

3. The load driving control apparatus according to claim 1, wherein:

the slope calculating part calculates the first slope and the second slope by using, as the two sets of data, an increase-time data at a current increase control time, in which the actual current value is larger at the end time point than at the start time point, and a decrease-time data at a current decrease control time, in which the actual current value is smaller at the end time point than at the start time point.

4. The load driving control apparatus according to claim 1, wherein:

a current use range of the inductive load is divided into plural current areas;

the current calculating part calculates the first slope and the second slope for each of the current areas; and the second calculating part calculates the duty ratio by using the first slope and the second slope in correspondence to each of the current areas.

5. The load driving control apparatus according to claim 1, wherein:

the first calculating part calculates the duty ratio by PID calculation.

6. The load driving control apparatus according to claim 1, wherein:

the duty setting part includes an initial duty ratio for the inductive load stored in memory corresponding to an initial PWM signal, and the duty setting part updates the initial duty ratio for the inductive load based on determinations made by the slope calculating part, the first calculating part, and the second calculating part to calculate the duty ratio.

* * * * *